United States Patent [19]

Shelhart et al.

[11] Patent Number: 5,279,119
[45] Date of Patent: Jan. 18, 1994

[54] HYDRAULIC LOCK AND BYPASS FOR VEHICLE HYDRAULIC SYSTEM

[75] Inventors: Robert E. Shelhart, Adrian, Mich.; Carl J. Klug, Lyons, Ohio

[73] Assignee: Wickes Manufacturing Company, Charlotte, N.C.

[21] Appl. No.: 873,396

[22] Filed: Apr. 24, 1992

Related U.S. Application Data

[63] Continuation-in-part of Ser. No. 659,642, Feb. 25, 1991, abandoned.

[51] Int. Cl.$^5$ .............................................. F16D 31/02
[52] U.S. Cl. ...................................... 60/401; 60/476; 91/420; 296/117
[58] Field of Search ................. 91/420, 468, 437, 438, 91/439; 417/440; 60/466, 426, 461, 468, 494, 400, 401, 473, 474, 476, 426; 296/117, 128

[56] References Cited

U.S. PATENT DOCUMENTS

| | | | |
|---|---|---|---|
| 1,144,758 | 6/1915 | Desmond | 137/868 X |
| 2,433,918 | 1/1948 | Mefferd | 417/440 |
| 2,657,533 | 11/1953 | Schanzlin et al. | 60/468 X |
| 2,916,879 | 12/1959 | Gondek | 91/420 X |
| 3,106,064 | 10/1963 | McLeod | 296/117 X |
| 3,312,058 | 4/1967 | Shelhart | 296/117 X |
| 3,412,685 | 11/1968 | Connelly | 417/440 |
| 3,468,126 | 9/1969 | Mercier | 91/420 X |
| 4,291,718 | 9/1981 | Sanin et al. | 91/420 X |
| 4,343,153 | 8/1982 | Kern et al. | 60/475 |
| 4,741,571 | 5/1988 | Godette | 296/107 |
| 5,010,733 | 4/1991 | Johnson | 60/489 |
| 5,067,768 | 11/1991 | Fischbach | 296/107 |

FOREIGN PATENT DOCUMENTS

| | | | |
|---|---|---|---|
| 1256383 | 12/1967 | Fed. Rep. of Germany | 91/420 |
| 1014296 | 8/1952 | France | 137/864 |
| 107405 | 7/1982 | Japan | 91/420 |
| 7309231 | 7/1973 | Netherlands | 91/420 |
| 985473 | 12/1982 | U.S.S.R. | 91/420 |

*Primary Examiner*—Edward K. Look
*Assistant Examiner*—F. Daniel Lopez
*Attorney, Agent, or Firm*—David A. Greenlee

[57] ABSTRACT

A vehicle convertible top has hydraulic cylinders for moving the top between extreme raised and lowered positions. The cylinders each have a pair of fluid translating ports each connected to ports in an elongated housing. A reversible hydraulic pump is in one end of the housing, while a reservoir is in the other end, separated by a pump cap. The pump cap houses two fluid circuits each connected to a housing port and each including an end of cycle hydraulic locking device which comprises a normally-closed valve and a valve actuator in each circuit. In one direction of pump operation, one of the valves is opened by pressure fluid in the one circuit to enable the outflow of the pressure fluid to the cylinders. The other valve is forced open by its actuator, in response to pressure in the one circuit, to enable the return flow of fluid to the pump through the other circuit. The one valve closes when the pump ceases operation, preventing fluid backflow through the one circuit to the pump. Reverse operation is similar. The pump cap includes makeup valving connected to the reservoir to accommodate fluid requirements due to cylinder displacement differential. At both cycle ends, the top is hydraulically locked in extreme raised and lowered positions to facilitate top latching and top stowage. A manually-operated bypass is provided in the pump cap to vent both circuits to the reservoir to enable manual top operation in the event of a pump failure.

13 Claims, 4 Drawing Sheets

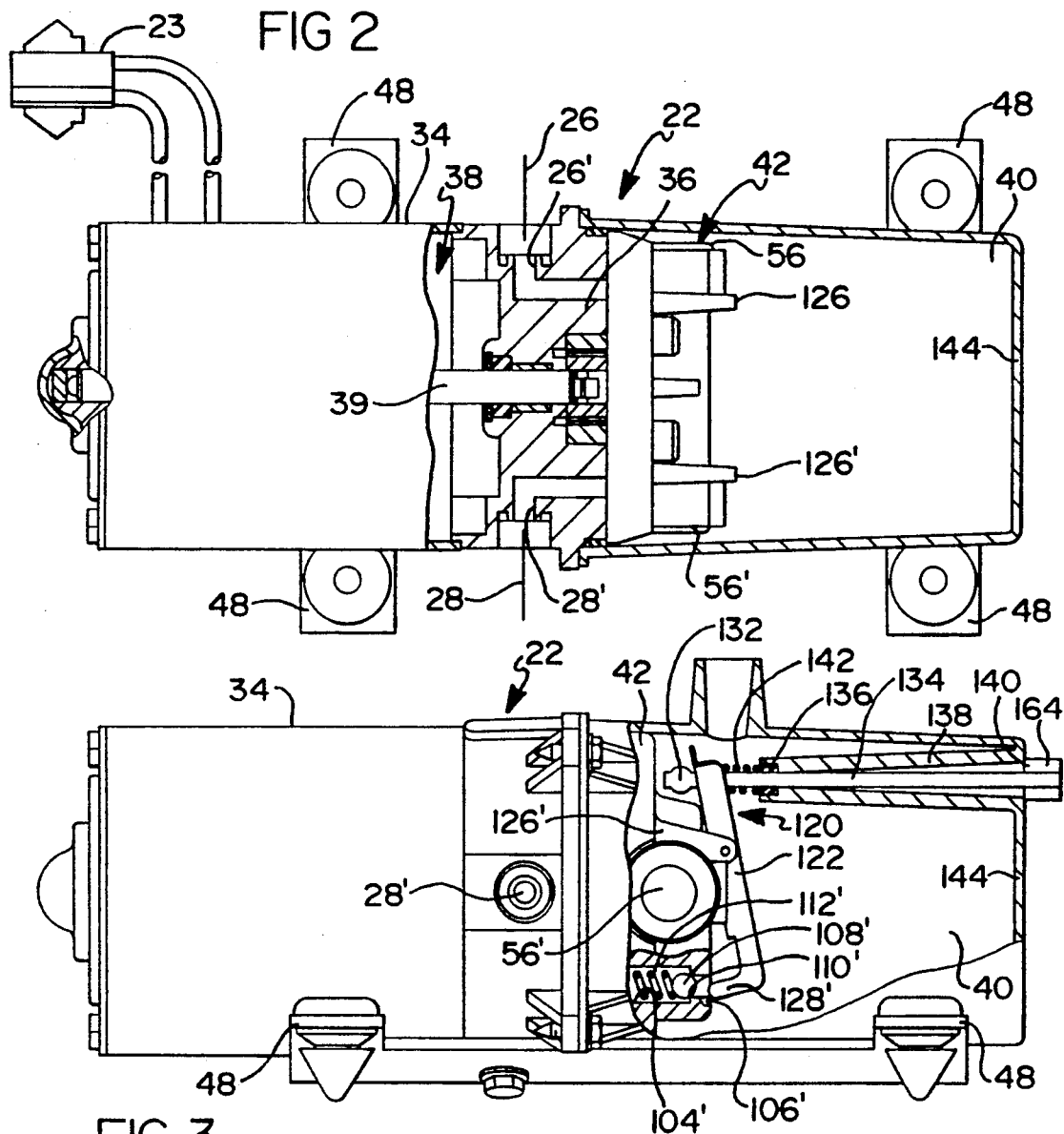
FIG 2
FIG 3
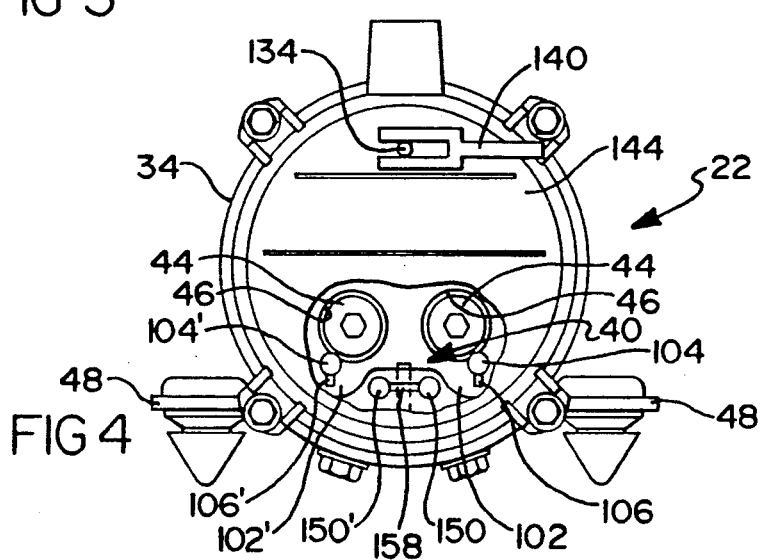
FIG 4

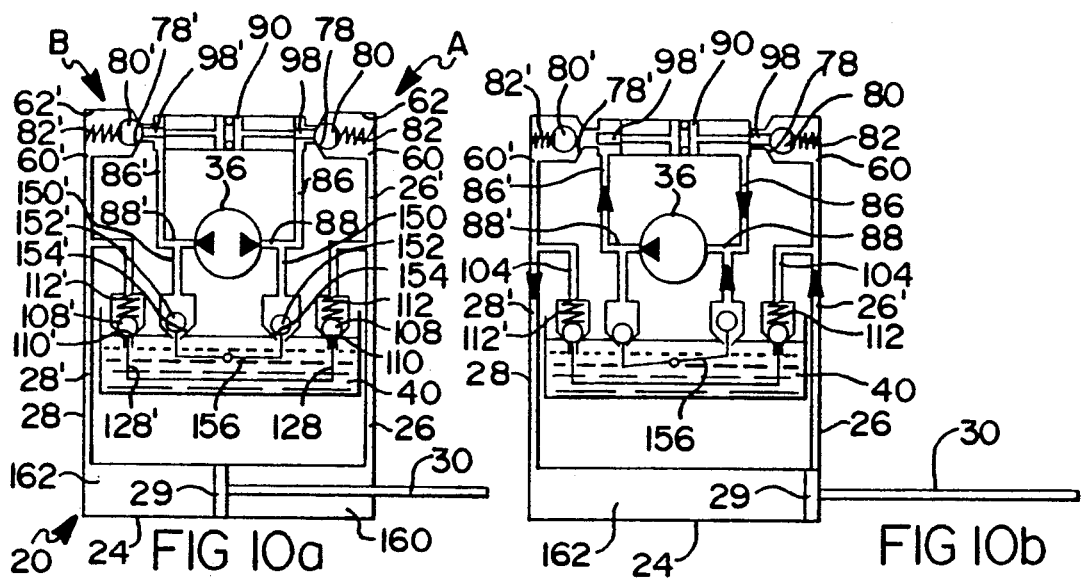
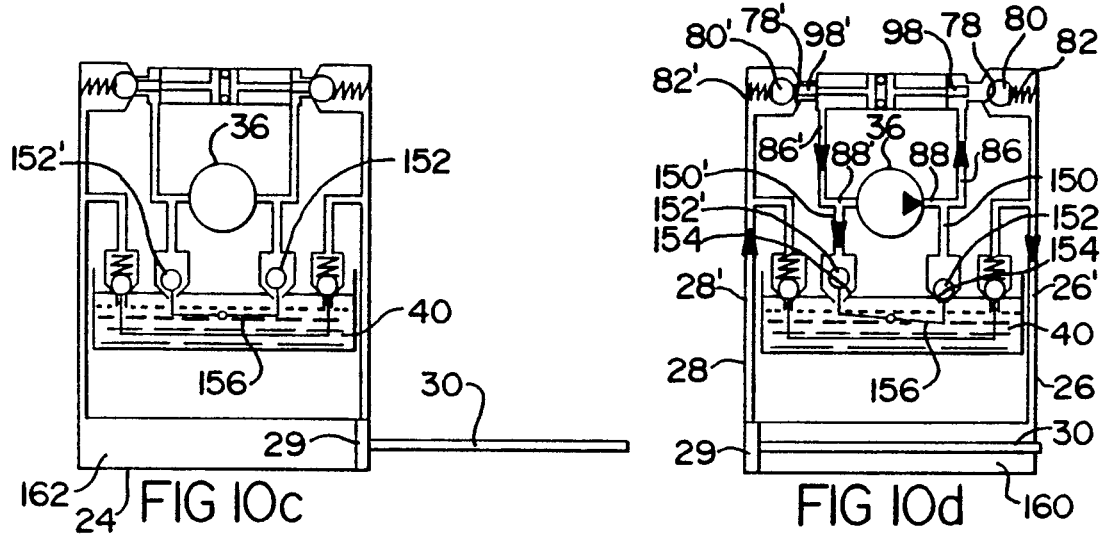
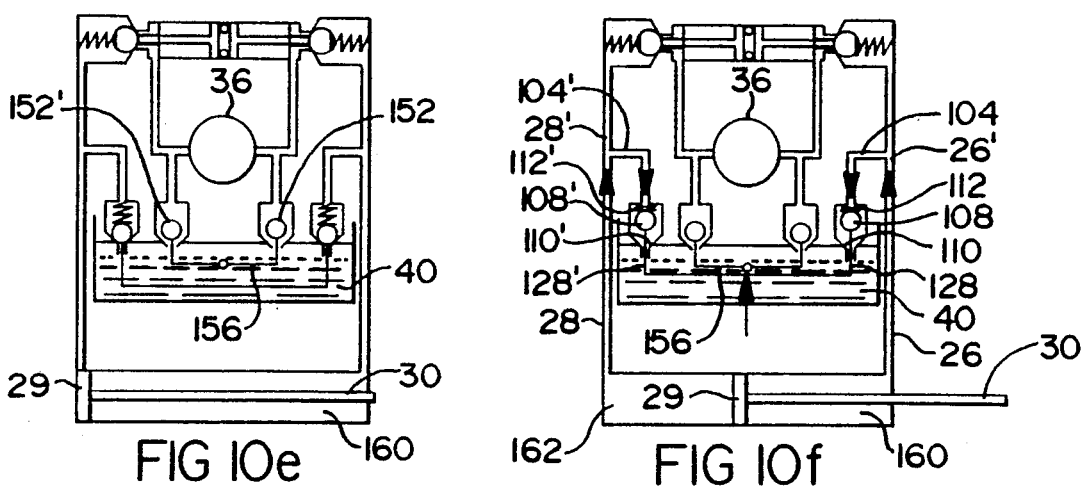

HYDRAULIC LOCK AND BYPASS FOR VEHICLE HYDRAULIC SYSTEM

This is a continuation-in-part of U.S. Ser. No. 07/659,642, filed Feb. 25, 1991, now abandoned.

FIELD OF THE INVENTION

This invention relates generally to a hydraulic power system for a vehicle convertible top and, more specifically, to an end of cycle device for such a hydraulic power system.

BACKGROUND OF THE INVENTION

Passenger Vehicles having convertible tops that can be raised to cover the passenger compartment and lowered to open the compartment predate the closed sedan type of vehicle and have been manufactured for many years. Recently, vehicles having convertible tops have become more popular with purchasers because of their ability to quickly convert from a closed vehicle to an open roadster by lowering the top. Consequently, automobile manufacturers are manufacturing a greater variety of these sporty vehicles.

The usual convertible top comprises an articulated top frame that supports a fabric cover. The frame includes a plurality of spaced transverse bows interconnecting articulated side rails that support the fabric cover. The rear of the cover is attached to the vehicle body or, in some cases, to a movable rear bow, as illustrated in U.S. Pat. No. 5,067,768 to Roderick C. Fischbach and assigned to the assignee herein. The front edge of the cover is attached to the front bow, called the top header.

The top header engages the top of the vehicle windshield frame, or windshield header, in top raised position. Header latches, such as shown in U.S. Pat. No. 4,741,571 to Godette, clamp the headers together and compress a seal between them. Upon releasing the latching mechanism, the top is folded and lowered into a boot located behind the passenger compartment. This action may be accomplished manually or by a power operator, usually a pair of hydraulic cylinders.

The top is raised by reversing this procedure, with switch actuation causing the hydraulic cylinders to raise and unfold the top until the top header is in close proximity to the windshield header. The latches are then manually engaged and operated to compress the seal and secure the headers together. One requirement of all convertible vehicles is that the top cover fit snugly on the frame so as to present a smooth, sleek appearance. This snug fit also reduces the vehicle's coefficient of drag, which affects gasoline mileage—a critical vehicle attribute. A snug fit is accomplished by stretching the cover taut over the frame. Cover stretching occurs at the end of the top raising cycle by fully extending the top frame and operating the header latches.

In a power-operated top, a switch is manually operated to actuate the power operator to raise the top. When a power-operated top is fully raised, the fabric cover is stretched when the hydraulic cylinders fully extend the frame linkage to move the top header into close proximity to the windshield header at the end of the cycle. When the power operator is turned off by releasing the manual actuation switch, hydraulic pressure quickly diminishes in the cylinders and the top "springs back" as the stretched fabric contracts, moving the headers apart. The top header must then be manually forced down onto the windshield header to enable the latches to be engaged and closed. Since this action again stretches the fabric cover, it requires a significant amount of manual effort.

This problem is exacerbated during cooler weather when the top fabric stiffens, requiring increased effort to manually stretch the cover fabric to engage the headers, followed by added effort to close the latches. The added manual effort required to accomplish top latching can be quite aggravating to the vehicle owner.

Although power latches have been devised, they are expensive and complex. Consequently, most convertible tops feature manual latches, the operation of which are plagued by the problem described above.

As a styling feature, it is desirable to have the top stored invisibly. Thus the top must store as fully within the well as possible. It is also desirable to store the top in as little space as possible, since the boot volume subtracts from the vehicle's luggage capacity. As a result, the boot is minimally dimensioned and the top is designed to fold into a compact package, with the tonneau fitting tightly over the stored top.

When the top is lowered, the power operator compresses the linkage and the folded fabric cover. When the power is turned off upon release of the switch, the top will "spring up" due to the elasticity of the top linkage and cover. This necessitates the use of additional manual effort to recompress the top and install the tonneau over the stored top. This problem is also exacerbated by cold weather, when the fabric cover stiffens.

It is quite desirable to reduce the manual effort required to latch a convertible top header to a windshield header.

It is also desirable to reduce the effort required to install a tonneau over a stored convertible top.

SUMMARY OF THE INVENTION

It is therefore an object of this invention to reduce the amount of manual effort required to latch a convertible top header to a windshield header.

It is another object of this invention to reduce the amount of manual effort required to install a tonneau over a stored convertible top.

It is a further object of this invention to provide a hydraulic power operator for a convertible top that incorporates an end of cycle hydraulic lock which maintains the top in extreme raised position to reduce the amount of manual effort required to latch the top header to the windshield header and in extreme lowered position to facilitate installation of the tonneau.

It is a yet further object of this invention to provide such an end of cycle lock that incorporates means for releasing the hydraulic lock to enable manual movement of the top in the event of a power failure.

In accordance with one embodiment, this invention features an end-of-cycle locking device for a vehicle having a convertible top and a hydraulic actuator for moving the top between extreme raised and lowered positions. The actuator has a pair of fluid translating ports each connected to a fluid translating circuit of a reversible hydraulic pump connected to the reservoir during operation for driving the actuator to raise the top. The end-of-cycle hydraulic locking device comprises a circuit valve in one of the circuits that opens in response to pressurization of that circuit to enable outflow of the pressure fluid to the actuator through that circuit when the pump is operating in one direction.

The circuit valve closes when the pump ceases operation, which prevents the backflow of fluid through that circuit to the pump. This locks the top in its extreme raised position with the top header in close proximity to the windshield header and greatly reduces the manual effort required to engage and operate the header latches. When the pump is operating in the other direction, the circuit valve closes in response to pressurization of the other circuit to force the circuit valve open to enable the return flow of pressure fluid through the circuit valve. A bypass including a normally-closed bypass valve connects the one circuit to the reservoir. A manual actuator is provided for opening the bypass valve to permit fluid flow from the first circuit to the reservoir to enable manual top operation in the event of pump failure.

In accordance with another embodiment, this invention features a second normally-closed circuit valve that is provided in the other circuit. A second valve actuator responds to pressure fluid in the first valve's circuit during pump operation in the one direction to open the second circuit valve to enable the return flow of pressure fluid to the pump through the second circuit valve. The second circuit valve is opened by pressure fluid to enable the outflow of pressure fluid to the actuator when the pump is operating in the other direction. The second circuit valve closes when the pump ceases operation in the other direction, which prevents the backflow of fluid through the other circuit to the pump. This hydraulically locks the top in its extreme lowered position and greatly facilitates installation of the tonneau. The second circuit also is provided with a manually-operated bypass to the reservoir.

In a preferred embodiment of this invention, each circuit valve comprises a seat in its circuit, a valving member, and a spring biasing the valving member into engagement with the seat to close the circuit. The valve actuator comprises a chamber open at each end to one of the circuits, a piston movable within the chamber and sealing the chamber ends from each other. A valve operator is carried by each end of the piston for unseating the valving member in the adjacent circuit in response to the force exerted on the other end of the piston by pressure fluid flowing to the valve actuator in the opposite circuit. This enables the return flow of fluid through the valve seat.

Preferably, makeup valving connects each circuit to the reservoir to provide makeup fluid or dump excess fluid when appropriate to accommodate hydraulic cylinder displacement differential which occurs during operation. The makeup valving is operated automatically by hydraulic fluid pressure.

These and further features of this invention will become more readily apparent upon reference to the following detailed description and the attached drawings, in which:

BRIEF DESCRIPTION OF THE DRAWINGS

FIG. 2 is a plan view of the hydraulic pumping unit of FIG. 1, which incorporates a pump cap which incorporates a hydraulic circuit locking device, according to this invention, and is partially broken-away;

FIG. 3 is a front view of the hydraulic pumping unit of FIG. 2, also partially broken-away;

FIG. 4 is an end view of the pumping unit of FIG. 2, also partially broken-away;

FIG. 10a-10f are schematic views of a hydraulic system for operating the convertible top of FIG. 1 and incorporating a hydraulic locking device and a by-pass device in accordance with this invention, illustrating the sequence of operation of the hydraulic system to raise and lower the convertible top.

DETAILED DESCRIPTION OF THE INVENTION

Figure 1:
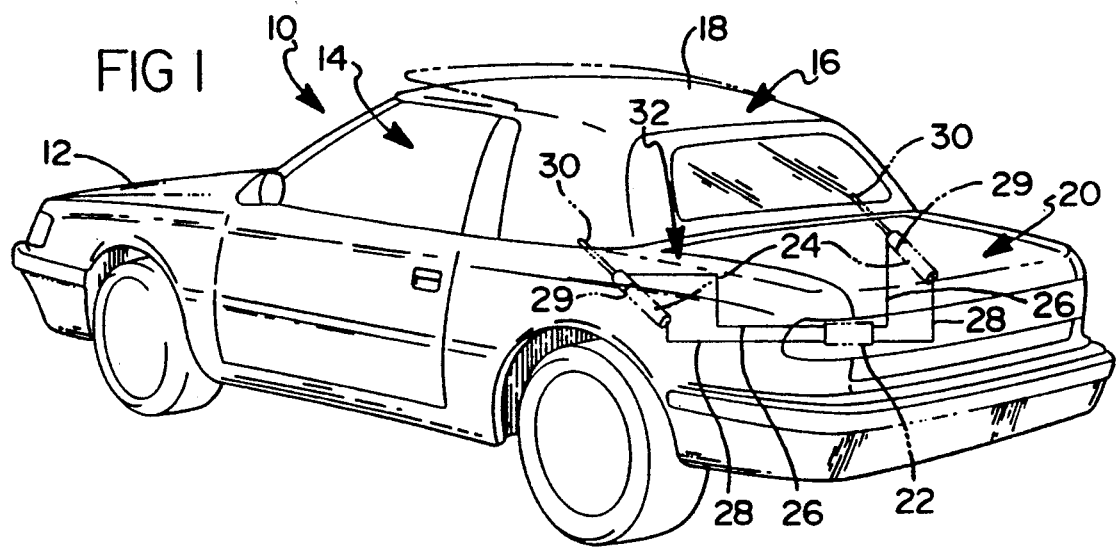
FIG. 1 is a perspective view of a passenger vehicle having a convertible top operated by a hydraulic system according to this invention, with the hydraulic system including a pumping unit shown schematically in phantom lines, and the top shown fully raised prior to latching in phantom lines and after latching in solid lines.

Referring now to FIG. 1 of the drawings, a passenger vehicle 10 has a body 12 that includes a passenger compartment 14 that is enclosed by a convertible top 16. The vehicle illustrated is disclosed in greater detail in U.S. Pat. No. 5,067,768 to Roderick C. Fischbach, and assigned to the assignee herein, the disclosure of which is incorporated herein by reference. Convertible top 16 comprises an articulated frame structure (not shown here, but fully disclosed in the Fischbach patent) that supports a fabric cover 18.

Top 16 is illustrated in its raised position and may be selectively lowered by operation of a hydraulic power system 20, shown schematically in phantom lines. The power system 20 comprises a reversible hydraulic pump unit 22 which is connected to a pair of identical hydraulic cylinders 24 by hydraulic fluid translating lines 26, 28. Each cylinder 24 has a piston 29 connected to a reciprocable output rod 30.

The linkage operatively connecting the cylinder rods 30 to the articulated frame is fully described in the Fischbach patent. The pump unit 22 may be selectively operated by manual actuation of a control switch 23, that is conventionally mounted in the passenger compartment 12, to operate the cylinders 24 to retract their rods 30 to raise top 16, or to extend the rods 30 to lower the top.

In the lowered position, top 16 is folded to lie completely within a well 32 located behind passenger compartment 14 in the vehicle body 12. The detailed operation of the top is set forth in greater detail in the Fischbach patent.

The power system 20 is depicted in greater detail in FIGS. 2-4. Pump unit 22 comprises a housing 34 which incorporates a reversible hydraulic pump 36 in one end. Pump 36 is preferably a gerotor pump which translates hydraulic fluid to/from cylinders 24 through passages 26', 28' which connect to lines 26, 28. Pump 36 is driven by a conventional reversible electric motor 38 through shaft 39, as controlled by switch 23.

In its other end, housing 34 incorporates a hydraulic fluid reservoir 40 which connects to pump 36 during operation to supply makeup fluid or receive excess fluid as required. A pump cover 42 is secured to and closes the end of pump 34 via bolts 44 extending through mounting holes 46 to isolate it from reservoir 40. Four mounting pads 48 are provided on housing 34 for mounting the power unit 22 at an appropriate location within vehicle 10, preferably beneath boot 32.

Figure 5:
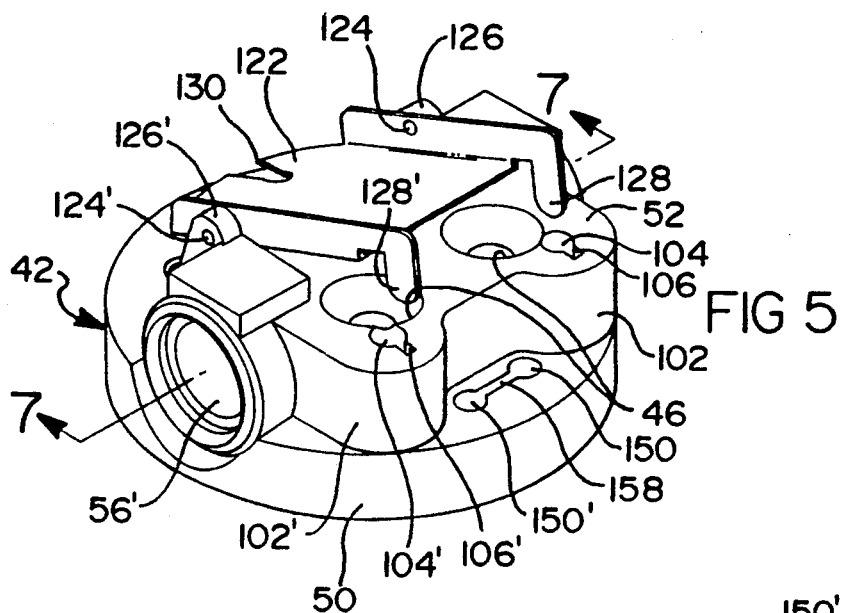
FIG. 5 is an enlarged top perspective view of the pump cap shown in FIGS. 2-4.

The structure of the end-of-cycle hydraulic lock feature of this invention will now be described with reference to FIGS. 5-7. Pump cover 42 comprises a generally cylindrical passage portion 50 and a valving portion 52. Valving portion 52 includes a stepped cylindrical bore 54 that is closed at either end by a pair of end caps 56, 56'. External ports 60, 60' connect passages 26', 28' to the enlarged end chambers 62, 62', respectively, of bore 54.

A pair of identical inserts 64, 64' are inserted into end chambers 62, 62' to abutment with shoulders 66, 66' which define a smaller stepped central section 68 of bore 62. The inserts 64, 64' comprise bodies 70, 70' having stepped bores formed of respective segments 72, 74, 76 and 72', 74', 76'.

Conical valve seats 78, 78' connect segments 72 and 74, and 72' and 74' Ball valving elements 80, 80' are biased into sealing contact with seats 78, 78' by compression springs 82, 82', which together form ball-type circuit valves.

Insert segments 76, 76' have the same diameter as, and form an extension of, central section 68 of bore 54. Inserts 64, 64' have radial ports 84, 84' which connect the extended bore 76-68-76' with passages 86, 86' in body passage portion 50. Passages 86, 86' connect to pump 36 through kidney-shaped ports 88, 88'.

Figure 9:
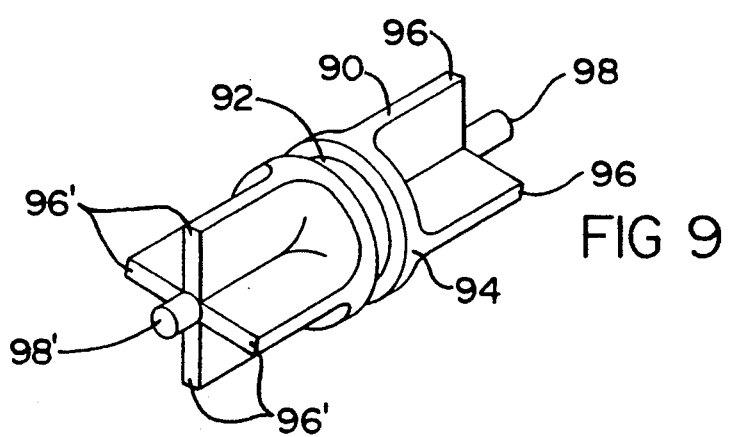
FIG. 9 is a perspective view of the valve actuator shown in FIGS. 7 and 8.

A valve actuator 90 is located in the extended bore 76-68-76'. As best seen in FIG. 9, actuator 90 has a double-ended cruciform shape and is symmetrical about a central annular groove 92 formed in a cylindrical central section 94.

The ends of actuator 90 each comprise four identical, mutually perpendicular fins 96, 96' extending axially from central section 94. The fins 96, 96' radiate from central valve operators in the form of axially-extending pins 98, 98'. The radially outer surfaces of the fins 96, 96' form cylindrical extensions of central section 94.

Figure 7:
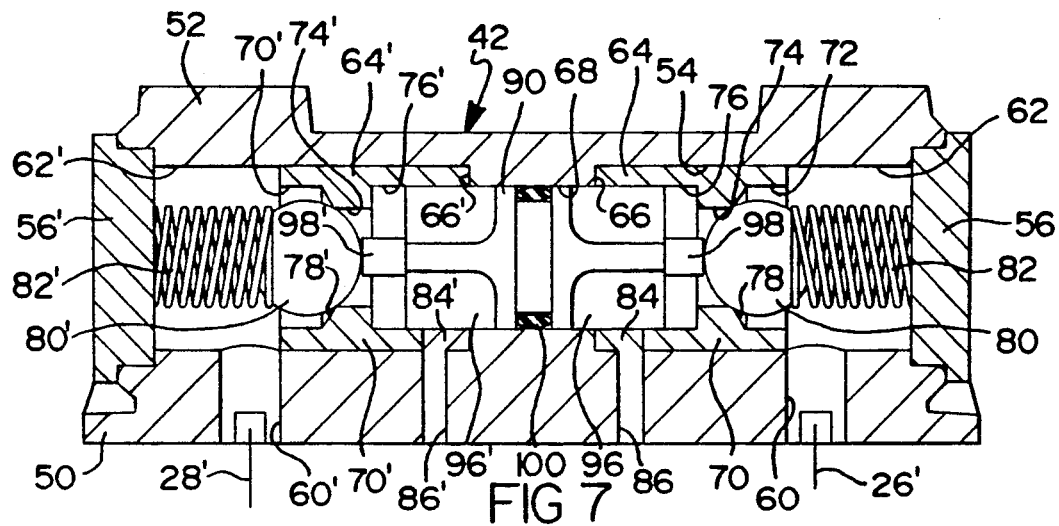
FIG. 7 is an enlarged sectional view of the pump cap of FIGS. 5 and 6, taken along the line 7-7 of FIG. 5, showing one embodiment of the hydraulic locking device of this invention.

An O-ring seal 100 is captured in groove 92 and serves to seal end chambers 62 and 62' from each other, as shown in FIG. 7. The open spaces between the fins 96, 96' enable free fluid communication between ports 60, 62' and respective valve seats 78, 78'. In the static state, illustrated in FIG. 7, valve actuator 90 is located centrally in bore 76-68-76' by the force of springs 82, 82' which seat balls 80, 80' that have minimal clearance with the pins 98, 98'.

The circuit valves 78, 80 and 78', 80' are opened directly or indirectly by fluid pressure. Pressure fluid supplied through passage 86 and port 84 will directly move ball 80 from seat 78 against the force of spring 82. Simultaneously, this pressure will force actuator 90 leftward and pin 98' will unseat ball 80', thus opening the circuit valve in indirect response to fluid pressure.

Similarly, pressure fluid supplied through passage 86' and port 84' will directly move ball 80' from seat 78' against the force of spring 82'. Simultaneously, this pressure will force actuator 90 rightward and pin 98 will unseat ball 80, thus opening the circuit valve in indirect response to fluid pressure.

The structure 52-100 just described comprises the end-of-cycle hydraulic lock feature of this invention. Its operation will be described in detail later.

FIGS. 3, 4, 5 and 6 illustrate the structure of the bypass valving feature of this invention. Pump cover body portion 50 includes bosses 102, 102' which house passages 104, 104' which have keyhole-shaped entries 106, 106'. Passages 104, 104' contain ball valving elements 108, 108' which are biased against seats 110, 110' by springs 112, 112'.

Figure 6:
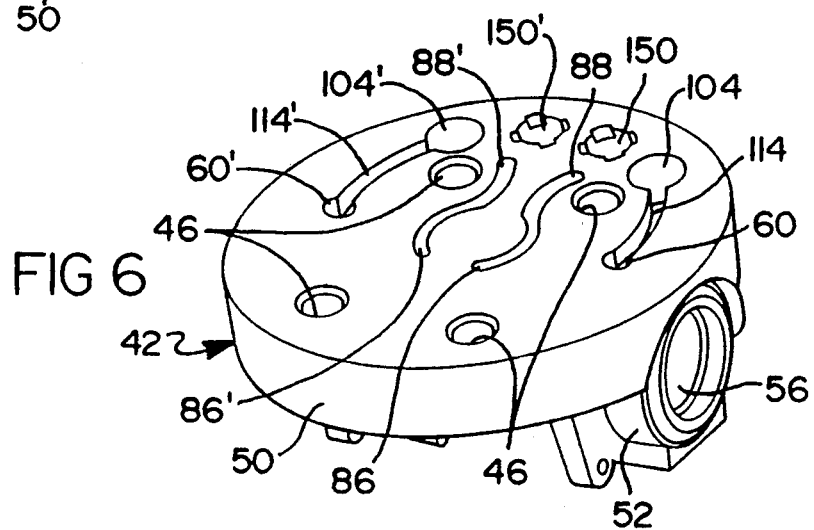
FIG. 6 is an enlarged bottom perspective view of the pump cap shown in FIG. 5.

Passages 104, 104' extend completely through pump cover 50, opening into respective arcuate passages 114, 114', as shown in FIG. 6. Passages 114, 114' connect to external pump ports 60, 60', which, in turn, are connected via passages 26', 28' to fluid translating lines 26, 28. This connects the cylinders 24 directly to reservoir 40 through bypass check valves comprising balls and seats 108, 110 and 108', 110' which are normally closed by springs 112, 112'.

A manual operator 120 is provided to open bypass check valves comprising balls and seats 108, 110 and 108', 110'. Operator 120 comprises a flat plate 122 pivoted at 124, 124' to bosses 126, 126' on cover portion 50. At one end, plate 122 incorporates two fingers 128, 128' which are engageable with balls 108, 108' to open the check valves.

The other end of plate 122 includes a notch 130 which receives the end 132 of an operating rod 134. Rod 134 extends through a seal 136 and a tower support 138 externally of reservoir 40 where it is pivoted eccentrically to a lever 140. A spring 142 extends between the inner end of tower 138 and plate 122 to bias fingers 128, 128' to an inoperative position out of contact with balls 108, 108'.

Lever 140 normally lies flat against the outer surface of housing end 144, as shown in FIGS. 3 and 4. Lifting lever 140 will reciprocate rod 134 outwardly of housing end 144, pivoting plate 122 upwardly against the force of spring 142. This will insert fingers 128, 128' through passage entries 106, 106' and into engagement with balls 108, 108' to open the check valves against the force of spring 112, 112'.

FIGS. 4, 5, 6 and 10 illustrate the structure of the makeup valving feature of this invention. Pump cover body portion 50 includes a pair of through passages 150, 150' located between bosses 102, 102'. The passages contain ball valving elements 152, 152' and valve seats 154, 154'. A valve operator, or rocker, 156 is pivoted within a slot 158 adjacent passages 150, 150' and rocks between positions unseating ball 152, while allowing ball 152' to seat, and unseating ball 152', while allowing ball 152 to seat. This action alternately connects pump ports 88 and 88' to reservoir 40.

Since the fluid capacity of the rod end cylinder chamber 160 is smaller than that of head end chamber 162 by the volume occupied by rod 30, pump 36 requires makeup fluid to enable the cylinders 24 to extend. Conversely, to enable cylinders 24 to retract, excess fluid must be pressure on the appropriate on one of balls 152, 152', which seats the ball, by rocking and unseating the other ball. This opens the appropriate circuit to the reservoir 40 to automatically supply makeup fluid when needed or dump excess fluid when necessary, depending on the direction of the movement of the hydraulic cylinders by the pump.

Operation of the hydraulic system to raise and lower convertible top 16 will now be described, with reference to FIGS. 10a-10f. These drawing figures schematically represent the hydraulic system described above and are arranged to illustrate sequential operation to raise and lower top 16.

Referring now to FIG. 10a, pump 36 is connected by port 88 into a first fluid translating circuit A which includes passage 86, port 84, bore 76, check valve 78, 80, chamber 62, port 60, passage 26' and line 26. This connects pump 36 to the rod ends 162 of cylinders 24.

Pump 36 is similarly connected by port 88' into a second fluid translating circuit B which includes passage 86', port 84', bore 76', circuit valve 78', 80', chamber 62', port 60', passage 28' and line 28. This connects pump 36 to the head ends 162 of cylinders 24.

In the FIG. 10a position, the cylinder rod 30 is partially extended, corresponding to a partially lowered (or partially raised) position of top 16. To lower the top from this position, pump 36 is operated to supply pressure fluid through circuit B. As illustrated in FIG. 10b, this action pressurizes port 88' and passages 86' and 150'.

Pressure in passage 86' unseats ball 78' and pressurizes passage 28', line 28 and head-end chamber 162, acting on piston 29 which forces rod 30 to extend, further lowering top 16. Pressure acting on the left side of actuator 90 forces it rightward, unseating ball 80.

Fluid is expelled from rod-end chamber 160 through circuit A. Fluid flows through line 26 and passage 26', past held-open ball 80, and through passage 86 and port 88 into pump 36.

The pressure in passage 150' of circuit B seats ball 152', isolating circuit B from reservoir 40. This pivots rocker 156 to force ball 152 off its seat 154, opening circuit A to reservoir 40. The make-up fluid required to enable cylinder movement is drawn from reservoir 40, past ball 152 and through passage 150 and port 88 into pump 36.

At the end of the top retraction cycle, piston 29 bottoms out on the end of cylinder 24. Release of control switch 23 causes pump 36 to cease operation and pressure equalizes across seat 78', enabling spring 82' to quickly seat ball 80'. This traps pressure fluid in chamber 62' by preventing fluid backflow through circuit B. As a result, rod 30 is held fully extended, which maintains top 16 in the fully retracted position to facilitate tonneau installation.

At this time, the hydraulic system will be as illustrated in FIG. 10c, with spring 82 forcing ball 80 to seat by moving the actuator piston 90 to its centered position in circuit A. Rocker 156 is in its neutral position, with both balls 152, 152' unseated.

To raise top 16, the tonneau is removed and actuation of the control switch 23 causes pump 36 to pressurize circuit A. As illustrated in FIG. 10d, this action pressurizes port 88 and passages 86 and 150.

Pressure in passage 86 unseats ball 78 and pressurizes passage 26', line 26 and rod-end chamber 160, acting on piston 29 which forces rod 30 to retract, raising top 16. Pressure acting on the right side of actuator 90 forces it leftward, unseating ball 80'. Fluid is expelled from head-end chamber 162 through line 28 and passage 28', past held-open ball 80', and through passage 86' and port 88' into pump 36.

The pressure in passage 150 seats ball 152, isolating circuit A from reservoir 40. This pivots rocker 156 to force ball 152' off its seat 154', opening circuit B to reservoir 40. The excess fluid from head end chamber 162 is dumped into reservoir 40, through port 88 and passage 150, and past ball 152.

At the end of the top raising cycle, piston 29 bottoms out on the end of cylinder 24. Release of control switch 29 stops pump 36 and pressure equalizes across seat 76, enabling spring 82 to quickly seat ball 80. This traps pressure fluid in chamber 62, preventing fluid backflow through circuit A, keeping rod 30 fully retracted.

As a result, top 16 is held in the fully raised and extended position, with the top header adjacent the windshield header to facilitate header latch operation. At this time, the hydraulic system will be as illustrated in FIG. 10e, with spring 82' forcing ball 80' to seat by moving the actuator 90 to its centered position. Rocker 156 is in its neutral position, with both balls 152, 152' unseated.

Figure 8:
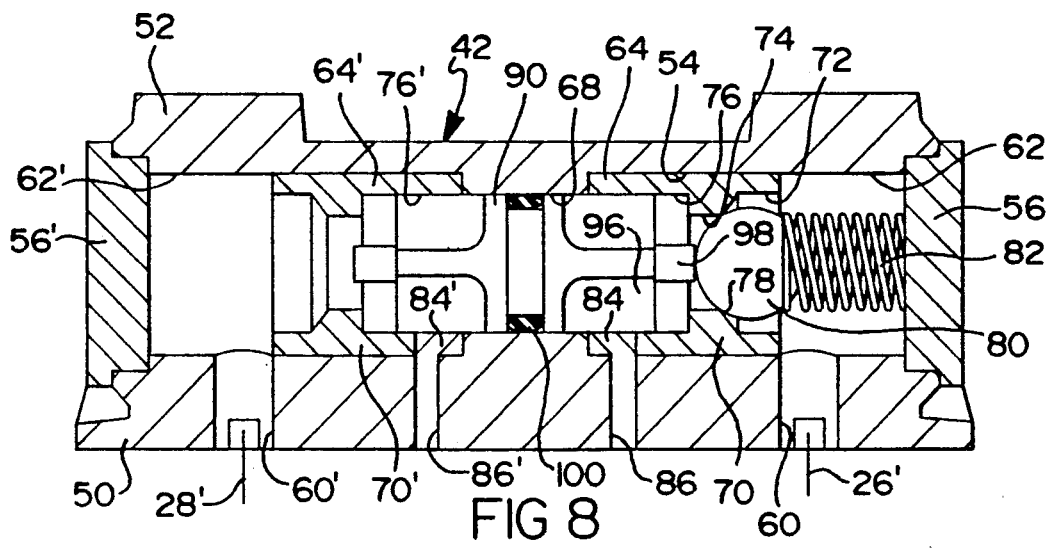
FIG. 8 is a view similar to FIG. 7 showing another embodiment of the hydraulic locking device of this invention.

Referring now to FIG. 8, another embodiment of this invention will be described. In certain cases where space is not a problem, it may not be necessary to hydraulically lock the top in lowered position. In that case both the ball 80' and spring 82' can be omitted from chamber 62' in circuit B. With this arrangement, the operation to raise the top will be as described above. However, upon top lowering, pressure fluid will not be trapped in head-end The above operation will occur so long as pump 36 is operable. However, should pump 36 or its driving electric motor fail, the top would by hydraulically locked. This would prevent manual movement, which could otherwise occur if there were no hydraulic lock. Thus, the top could be locked in lowered position with the vehicle subjected to rain, or the top could be locked in an intermediate position, preventing the vehicle from being driven.

To accommodate such a power loss, the bypass described above is provided to enable emergency manual movement. The pump unit is accessed by the driver, who merely flips lever 140 upright, extending from casing end 144. This pulls rod 134 outward, pivoting plate 122 and causing fingers 128, 128' to unseat bypass balls 108, 108', as illustrated in FIG. 10f.

Now, both circuits A and B are open to reservoir 40 through passages 150, 150'. The head ends 162 of cylinders 24 are now in free communication with the rod ends 160 through the reservoir, removing the hydraulic lock. The top may now be manually moved. The flat inner end 164 on lever 140 holds the lever in operated position. This assures that this free communication will continue until lever 140 is purposefully moved back to its inoperative position flat against housing end 144. This enables emergency manual movement of top 16.

Thus, by providing for locking of the hydraulic system, this invention reduces the manual effort required to install the tonneau and/or to operate the header latches. A bypass is provided to unlock the hydraulic system, enabling emergency manual top movement. While only a preferred and alternative embodiments have been illustrated, obvious modifications are contemplated within the scope of this invention and the following claims.

We claim:

1. In a vehicle having a convertible top, a hydraulic actuator for moving the convertible top between extreme raised and lowered positions and having a pair of fluid translating ports, a hydraulic fluid reservoir, and a motor-operated reversible hydraulic pump connected to the reservoir during operation and having a first fluid translating circuit connected to an actuator port for driving the actuator to raise the top and a second fluid translating circuit connected to the other actuator port for driving the actuator to lower the top, an end of cycle locking device comprising a normally-closed first circuit valve in the first circuit that is opened by pressure fluid from the pump to enable outflow of pressure fluid to the actuator in the first circuit during pump operation in one direction, wherein the first circuit valve closes when the pump ceases operation, thus preventing the backflow of fluid through the first circuit to the pump which locks the top in extreme raised position, a first valve actuator for the first circuit valve operable in response to pressure fluid in the second circuit during pump operation in the other direction to open the first circuit valve to enable the return flow of pressure fluid through the first circuit, a first bypass including a first normally-closed bypass valve connecting the first circuit to the reservoir, and a manual actuator for opening the bypass valve to permit fluid flow from the first circuit to the reservoir to enable manual movement of the top when the pump is not operating.

2. The locking device of claim 1, wherein the first circuit valve comprises a seat in the first circuit, a valving member, and a spring biasing the valving member into engagement with the seat to close the circuit; and the first actuator comprises a chamber open at one end to the first circuit and at the other end to the second circuit, a piston movable within said chamber and sealing the chamber ends from each other, and a valve operator carried by one end of the piston for unseating the valving member in response to the force exerted on the other end of the piston by pressure fluid in the second circuit, thus enabling the return flow of fluid through the valve seat.

3. The locking device of claim 1, including a second normally-closed circuit valve in the second circuit that is opened by pressure fluid from the pump to enable outflow of pressure fluid to the actuator in the second circuit during pump operation in the other direction, wherein the second circuit valve closes when the pump ceases operation, thus preventing the backflow of fluid to the pump through the second circuit to hydraulically lock the top in extreme lowered position, a second valve actuator for the second circuit valve operable in response to pressure fluid in the first circuit during pump operation in the one direction to open the valve to enable the return flow of pressure fluid in the second circuit, a second bypass including a second normally-closed bypass valve connecting the second circuit to the reservoir, and a manual actuator for opening the second bypass valve to permit fluid flow from the second circuit to the reservoir to enable manual movement of the top when the pump is not operating.

4. The locking device of claim 3, wherein each circuit valve comprises a seat in its circuit and a valving member engageable with the seat to close the circuit; and the valve actuator comprises a chamber open at each end to one of the circuits, a piston movable within said chamber and sealing the chamber ends from each other, and a valve member operator carried by each end of the piston for unseating the valving member in that circuit in response to the force exerted on the other end of the piston by pressure fluid in the other circuit, thus enabling the return flow of fluid through the valve seat.

5. The locking device of claim 3, wherein the first and second circuit valve actuators comprise a pressure-responsive device exposed on one side to one circuit and on the opposite side to the other circuit, and a valve operator carried by each side of the device for unseating the circuit valve in that circuit in response to the force exerted on the device by pressure fluid in the opposite circuit.

6. In a vehicle having a convertible top, a hydraulic cylinder for moving the convertible top between extreme raised and lowered positions and having a pair of fluid translating ports, a hydraulic fluid reservoir, and a motor-operated reversible hydraulic pump connected to the reservoir during operation and having a first fluid translating circuit connected to one cylinder port for driving the cylinder to raise the top and a second fluid translating circuit connected to the other cylinder port for driving the cylinder to lower the top, an end of cycle locking device comprising closes when the pump ceases operation, thus preventing the backflow of fluid through the first circuit to the pump which locks the top in extreme raised position, a circuit valve actuator for the circuit valve operable in response to pressurization of the second circuit during pump operation in the other direction to open the valve to enable the return flow of pressure fluid through the first circuit, a bypass including a normally-closed bypass valve connecting the first circuit to the reservoir, and a manual actuator for opening the bypass valve to permit fluid flow from the first circuit to the reservoir to enable manual movement of the top when the pump is not operating.

7. The locking device of claim 6, including a second normally-closed circuit valve in the second circuit that is opened by pressurization of the second circuit to enable outflow of pressure fluid to the actuator in the second circuit during pump operation in the other direction, wherein the second circuit valve closes when the pump ceases operation, thus preventing the backflow of fluid to the pump through the second circuit to hydraulically lock the top in extreme lowered position, a second circuit valve actuator for the second circuit valve operable in response to pressurization of the first circuit during pump operation in the one direction to open the second circuit valve to enable the return flow of pressure fluid in the second circuit, a second bypass including a second normally-closed bypass valve connecting the second circuit to the reservoir, and a manual actuator for opening the second bypass valve to permit fluid flow from the second circuit to the reservoir.

8. In a vehicle having a convertible top movable by hydraulic cylinders having a displacement differential between cylinder ends upon movement to raise and lower the top, a hydraulic actuator having a pair of fluid translating ports each connected to a cylinder end for moving the convertible top between extreme raised and lowered positions, an elongated housing, a hydraulic fluid reservoir in one end of the housing, a motor-driven reversible hydraulic pump in the other end of the housing and having a pair of fluid translating ports opening externally of the housing, hydraulic conduits connecting the housing ports with the actuator ports, a pump cap sealing the pump from the reservoir within the housing, a first fluid translating circuit within the pump cap and connected to a housing port for driving the actuator to raise the top, and a second fluid translating circuit within the pump cap and connected to the other housing port for driving the actuator to lower the top, an end of cycle locking device within the pump cap, comprising a normally-closed circuit valve in the first circuit that is opened by pressure fluid from the pump to enable outflow of pressure fluid to the actuator in the first circuit during pump operation in one direction, wherein the circuit valve closes when the pump ceases operation, thus preventing the backflow of fluid through the first circuit to the pump which locks the top in extreme raises position, a valve actuator for the first circuit valve operable in response to pressure fluid in the second circuit during pump operation in the other direction to open the circuit valve to enable the return flow of pressure fluid through the first circuit, and makeup valving alternately connecting each of the circuits with the reservoir only during cylinder operation to accommodate hydraulic fluid requirements caused by cylinder displacement differential.

9. The locking device of claim 8, further comprising a bypass within said pump cap including a normally-closed bypass valve connecting each circuit to the reservoir, and a manual actuator for opening the bypass valves to permit fluid flow from the second circuit to the reservoir to enable manual movement of the top when the pump is not operating.

10. The locking device of claim 9, wherein said bypass valves include bal check valves and the manual actuator includes a pair of fingers mounted on the pump cap within the reservoir and a plunger extending outside the housing and reciprocable to move said fingers to unseat the check valve balls.

11. The locking device of claim 10, wherein the fingers are mounted on one end of a lever which is pivotally mounted on the pump cap within the reservoir, the plunger is attached to the other lever end and is reciprocable outwardly of the housing to pivot the lever and unseat the check valve balls, and a spring is provided to bias the plunger inwardly of the housing.

12. In a vehicle having a convertible top, a hydraulic cylinders for moving the convertible top between extreme raised and lowered positions and having a pair of fluid translating ports, a reservoir of hydraulic fluid, and a motor-operated reversible hydraulic pump connected to the reservoir during operation and having a first fluid translating circuit connected to a cylinder port for driving the cylinder to raise the top and a second fluid translating circuit connected to the other cylinder port for driving the cylinder to lower the top, an end of cycle locking device comprising a normally-closed circuit valve in the first circuit that is opened by pressure fluid from the pump to enable outflow of pressure fluid to the cylinder in the first circuit during pump operation in one direction, said circuit valve comprising the only flow restriction between the pump and the actuator in said first circuit, wherein the circuit valve closes when the pump ceases operation, thus preventing the backflow of fluid through the first circuit to the pump which locks the top in extreme raised position only, a circuit valve actuator for the circuit valve operable in response to pressure fluid in the second circuit during pump operation in the other direction to open the circuit valve to enable the free return flow of pressure fluid through the first circuit, whereby the top remains unlocked in the lowered position, a bypass including a normally-closed bypass valve connecting the first circuit to the reservoir, and a manual actuator for opening the bypass valve to permit fluid flow from the first circuit to the reservoir to unlock the top in extreme raised position to enable manual movement of the top when the pump is not operating.

13. In a vehicle having a convertible top, a hydraulic cylinder for moving the convertible top between extreme raised and lowered positions and having a pair of fluid translating ports, a hydraulic fluid reservoir, and a motor-driven reversible hydraulic pump connected to the reservoir during operation and having a first fluid translating circuit connected to a cylinder port for driving the cylinder to raise the top and a second fluid translating circuit connected to the other cylinder port for driving the cylinder to lower the top, and end of cycle locking device comprising a normally-closed circuit valve in the first circuit that is opened by pressure fluid from the pump to enable outflow of pressure fluid to the cylinder in the first circuit during pump operation in one direction, wherein the valve closes when the pump ceases operation, thus preventing the backflow of fluid through the first circuit to the pump which locks the top in extreme raised position, a valve actuator for the circuit valve operable in response to pressure fluid in the second circuit during pump operation in the other direction to open the circuit valve to enable the free return flow of pressure fluid through the first circuit, a second normally-closed circuit valve in the second circuit that is opened by pressure fluid from the pump to enable outflow of pressure fluid to the cylinder in the second circuit during pump operation in the other direction, wherein the second circuit valve closes when the pump ceases operation, thus preventing the backflow of fluid to the pump through the second circuit to hydraulically lock the top in extreme lowered position, a valve actuator for the second circuit valve operable in response to pressure fluid in the first circuit during pump operation in the one direction to open the valve to enable the free return flow of pressure fluid in the second circuit, said first and second valves comprising the only flow restrictions between the pump and the actuator in either circuit, a bypass including a normally-closed bypass valve connecting each circuit to the reservoir, and a manual actuator for opening the bypass valves to permit fluid flow from the second circuit to the reservoir to unlock the top in either extreme position to enable manual movement of the top when the pump is not operating.

* * * * *

UNITED STATES PATENT AND TRADEMARK OFFICE
CERTIFICATE OF CORRECTION

PATENT NO. : 5,279,119
DATED : January 18, 1994
INVENTOR(S) : Robert E. Shelhart et al It is certified that error appears in the above-indentified patent and that said Letters Patent is hereby corrected as shown below:

Col. 10, Claim 6, line 15, "cycle locking device comprising closes when the pump" should read -- cycle locking device comprising a normally-closed circuit valve in the first circuit that is opened upon pressurization of the first circuit fluid to enable outflow of pressure fluid to the cylinder in the first circuit during pump operation in one direction, wherein the valve closes when the pump --.

Col. 11, Claim 8, line 10, "in extreme raises position" should read -- in extreme raised position --.

Col. 11, Claim 10, line 30, "include bal check valves" should read -- include ball check valves --.

Signed and Sealed this

Twenty-first Day of June, 1994

Attest:

BRUCE LEHMAN

Attesting Officer

Commissioner of Patents and Trademarks